No. 635,281. Patented Oct. 24, 1899.
J. ADAIR.
RACK FOR PENHOLDERS, &c.
(Application filed Dec. 2, 1898.)

(No Model.) 2 Sheets—Sheet 1.

WITNESSES:
Chas. F. Miller.
F. M. Dapper.

INVENTOR,
James Adair
by Damon S. Wolcott
Att'y.

THE NORRIS PETERS CO., PHOTO-LITHO., WASHINGTON, D. C.

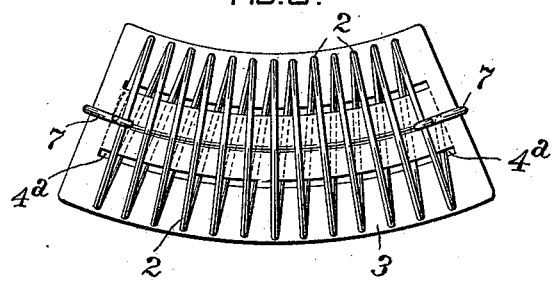
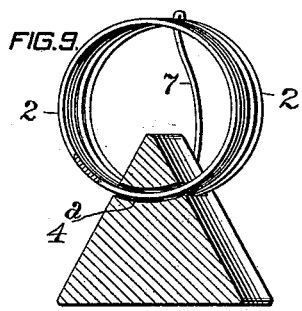
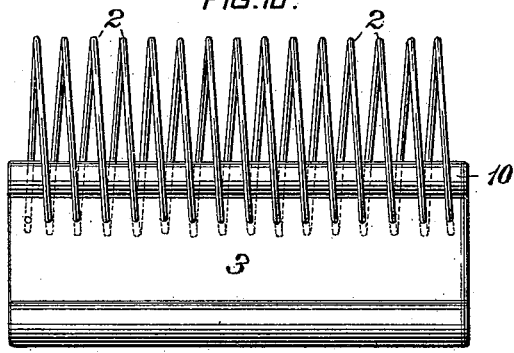
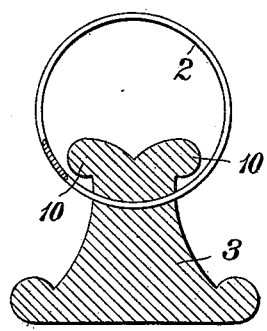
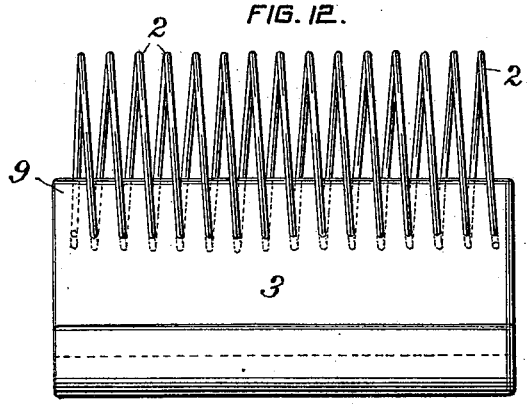
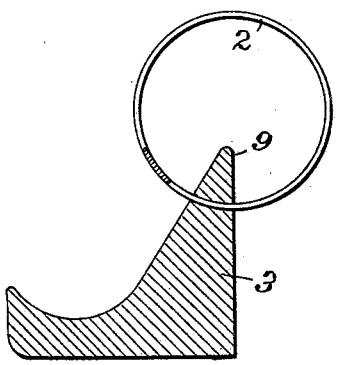

UNITED STATES PATENT OFFICE.

JAMES ADAIR, OF LEET, PENNSYLVANIA.

RACK FOR PENHOLDERS, &c.

SPECIFICATION forming part of Letters Patent No. 635,281, dated October 24, 1899.

Application filed December 2, 1898. Serial No. 698,061. (No model.)

*To all whom it may concern:*

Be it known that I, JAMES ADAIR, a citizen of the United States, residing in Leet township, in the county of Allegheny and State of Pennsylvania, have invented or discovered certain new and useful Improvements in Racks for Penholders, &c., of which improvements the following is a specification.

The invention described herein relates to certain improvements in racks for penholders, &c., and has for its object a construction whereby a series of laterally-yielding fingers may be secured in proper relation to each other on a base of such weight as to hold the rack steady while inserting or removing the penholder, &c.

It is a further object of the invention to so construct the fingers and base and to secure them together in such relation to each other as to form supplemental containers for the penholders, &c.

The invention is hereinafter more fully described and claimed.

Figure 1:
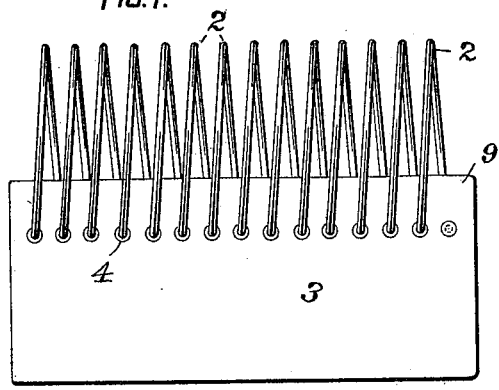
Figure 2:
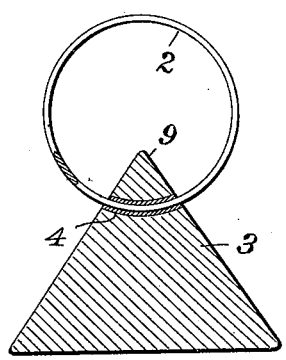
Figure 3:
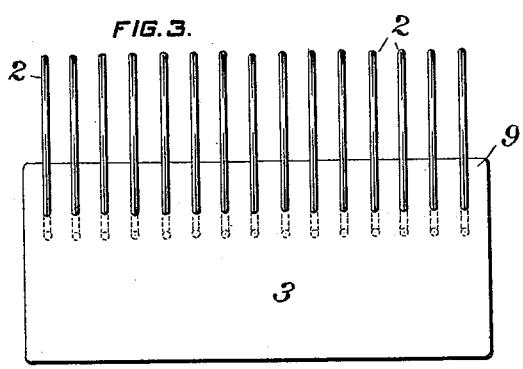
Figure 4:
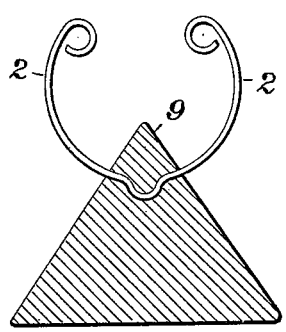
Figure 5:
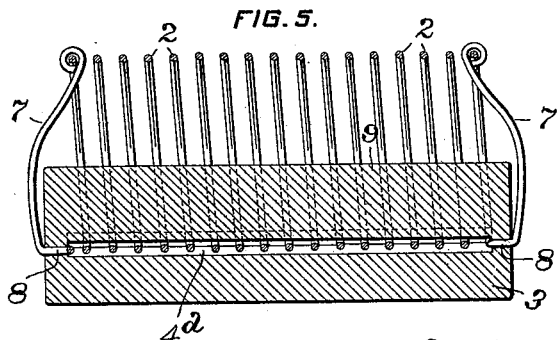
Figure 6:
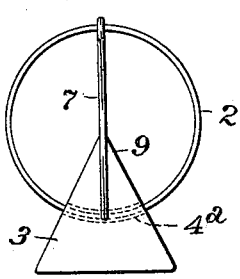
Figure 7:
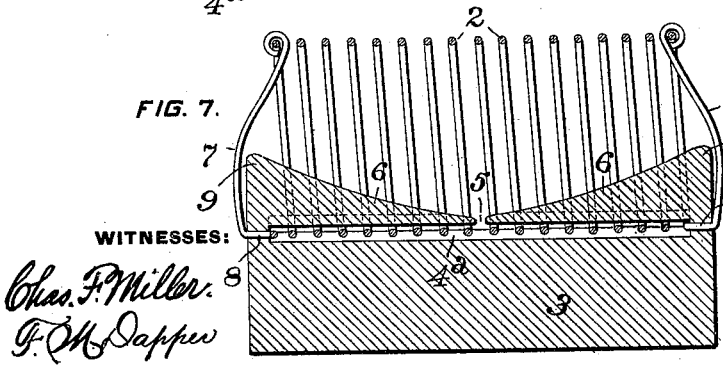

In the accompanying drawings, forming a part of this specification, Figure 1 is a side elevation of my improved rack. Fig. 2 is a sectional elevation of the same. Figs. 3 and 4 are views similar to Figs. 1 and 2, illustrating a modification. Figs. 5 and 6 are a sectional and an end elevation of modifications of the construction shown in Figs. 3 and 4. Fig. 7 is a longitudinal sectional elevation of a modification of the structure shown in Fig. 5. Fig. 8 is a plan, and Figs. 10 and 12 are side elevations, illustrating modifications in the base or support for the fingers; and Figs. 9, 11, and 13 are sectional elevations of the forms shown in Figs. 8, 10, and 12, respectively.

In the practice of my invention the clamping-fingers 2 consist of a series of spiral coils formed by bending resilient metal bands or wire spirally around a suitable mandrel. These fingers are secured to the base or foundation 3 by inclosing the coils in such manner in a mold that a portion of each coil will project into the matrix of the mold and the material—*e. g.*, metal, glass, &c.—poured or pressed into the matrix and around the portions of the coils or fingers projecting into the matrix. If it should be desired to permit the fingers some freedom of movement in the seats in the base, the portions of the coils or fingers projecting into the mold-matrix are coated with some suitable resisting material to prevent the material of the base adhering to the fingers. If it is preferred that the fingers should be held rigidly in their seats in the base, the portions inclosed by the base are bent so as to form a projection or irregular portion 3ª, as seen in Fig. 4.

As shown in Figs. 3 and 4, the fingers may be independent of each other, each consisting of a suitably-bent piece of wire 2ª, having its free ends bent or curved, as shown, to avoid sharp upwardly-projecting points.

In lieu of casting or pressing the base around portions of the fingers the base may be formed with a series of perforations 4, slightly larger than the wire or band from which the fingers are formed, as shown in Fig. 2. In such case the fingers when formed integral with each other are threaded into the base by a rotation of the coil on its axis. If desired, the eyes or holes in the base may be filled with metal after the insertion of the fingers, thereby securing the latter firmly in position.

In lieu of a series of perforations or holes for the fingers a continuous slot 4ª may be formed in the base, as shown in Figs. 5 to 9, inclusive. The fingers are threaded onto the slotted base by turning the coil on its axis, or a transverse slot 5 may be formed, connecting with the slot 4ª, and the fingers placed in position by sliding them laterally through the slot 5 into the longitudinal slot. To facilitate this manner of attaching the fingers to the base, a portion of the latter on one or both sides of the transverse slot 5 is cut away or inclined, as shown at 6 in Fig. 7. As the fingers or coils when they are in slots in the base are liable to follow their natural tendency and close together, the ends 7 of the coil are passed through holes 8 in the base and bent up, so as to engage the end fingers and hold the fingers apart both in the base and at their upper sides, as shown in Figs. 5 to 7, inclusive. In order to allow the fingers or coils to move freely along the slot in the base, it is preferred that the sides of the slot should conform, approximately, to the curvature of the portions of the fingers or coils inclosed by the slot.

The base as regards its general cross-sectional contour is triangular or a close approximation thereto, and the fingers are so secured to the base or foundation that the special portion 9 will project between the sides of the fingers and form, in conjunction with the latter, receptacles for pencils, penholders, &c. The shape of the portion 9 may be changed to suit the taste or particular purposes—as, for example, in Figs. 10 and 11 the portion 9 is formed with two side ribs 10, the intermediate portion being depressed, forming an additional receptacle. As shown in Figs. 10 to 13, one or both of the sides of the base or foundation may be so altered as to form receptacles. The base or foundation may be made straight or slightly curved or bent, as shown in Fig. 8.

I claim herein as my invention—

1. In a rack for penholders, &c., the combination of a block or base, a series of bent or curved fingers secured to the base in such manner that a portion of the latter will project up between the sides of the fingers, so as to form in connection with the fingers grooves or troughs for the reception of penholders or pencils, substantially as set forth.

2. In a rack for penholders, &c., the combination of a block or base substantially triangular in cross-section, and a series of bent or curved fingers attached to the base below the apex thereof, the sides of the fingers projecting from opposite sides of the base and extending above the apex, the portion of the base projecting above the point of junction of the fingers with the base forming in connection with the fingers troughs or grooves for the reception of fingers, &c., substantially as set forth.

3. In a rack for penholders, &c., the combination of a block or base provided with a longitudinal slot and a series of bent or curved fingers arranged in said slot and having their sides projecting above the base or block, substantially as set forth.

4. In a rack for penholders, &c., the combination of a block or base provided with a longitudinal slot, a wire coil forming a series of fingers, having portions arranged in said slot, and means for holding the fingers spread uniformly along the slot, substantially as set forth.

5. In a rack for penholders, &c., the combination of a block or base provided with a longitudinal slot, a wire coil forming a series of fingers having portions arranged or supported in said slot, the ends of the coil being passed through holes at the ends of the block or base and engaging the fingers at the ends of the coil, substantially as set forth.

6. In a rack for penholders, &c., the combination of a block or base provided with a longitudinal slot and a series of bent or curved fingers arranged in said slot, the walls of the latter conforming to the curvature of the fingers, substantially as set forth.

7. In a rack for penholders, &c., the combination of a block or base provided with a longitudinal slot and a transverse slot extending into the longitudinal slot, and a coil forming a series of fingers having portions arranged in the longitudinal slot, substantially as set forth.

8. In a rack for penholders, &c., the combination of a block or base provided with longitudinal and transverse slots, the transverse slot extending into the longitudinal slot, a portion of the block adjacent to the transverse slot being beveled or inclined toward the slot, and a coil forming a series of fingers having portions arranged in the longitudinal slot, substantially as set forth.

In testimony whereof I have hereunto set my hand.

JAMES ADAIR.

Witnesses:
DARWIN S. WOLCOTT,
F. E. GAITHER.